United States Patent
Link et al.

(10) Patent No.: US 6,952,636 B2
(45) Date of Patent: Oct. 4, 2005

(54) METHOD OF DETERMINING THE CRASH PHASES RELEVANT TO THE TRIGGERING OF A PASSIVE SAFETY DEVICE IN A VEHICLE

(75) Inventors: Andrea Link, Munich (DE); Willibald Watzka, Aichach (DE); Jan Urbahn, Munich (DE)

(73) Assignee: Bayerische Motoren Werke Aktiengesellschaft, Munich (DE)

( * ) Notice: Subject to any disclaimer, the term of this patent is extended or adjusted under 35 U.S.C. 154(b) by 0 days.

(21) Appl. No.: 10/844,573

(22) Filed: May 13, 2004

(65) Prior Publication Data

US 2005/0010346 A1 Jan. 13, 2005

Related U.S. Application Data

(63) Continuation of application No. PCT/EP02/10662, filed on Sep. 23, 2002.

(30) Foreign Application Priority Data

Nov. 13, 2001 (DE) .......................................... 101 55 659

(51) Int. Cl.$^7$ ................................................. G05D 1/00
(52) U.S. Cl. ......................... 701/45; 701/301; 340/436; 340/903; 280/735; 180/271
(58) Field of Search ............................. 701/45, 46, 47, 701/301; 340/436, 667, 669, 438, 903; 280/728.1, 735, 734; 180/271, 282, 232; 307/10.1; 342/70, 71, 72

(56) References Cited

U.S. PATENT DOCUMENTS

| 5,363,302 | A | * | 11/1994 | Allen et al. | 701/46 |
|---|---|---|---|---|---|
| 5,515,276 | A | * | 5/1996 | Kura et al. | 701/45 |
| 5,541,842 | A | * | 7/1996 | Gioutsos et al. | 701/45 |
| 5,583,771 | A | | 12/1996 | Lynch et al. | |
| 5,629,847 | A | * | 5/1997 | Shirakawa et al. | 701/45 |
| 5,702,124 | A | * | 12/1997 | Foo et al. | 280/735 |
| 5,790,404 | A | * | 8/1998 | Faye et al. | 701/45 |
| 6,116,639 | A | * | 9/2000 | Breed et al. | 280/735 |
| 6,480,144 | B1 | * | 11/2002 | Miller et al. | 342/72 |
| 6,636,794 | B2 | * | 10/2003 | Yamashita | 701/46 |
| 2001/0021890 | A1 | * | 9/2001 | Kanameda | 701/45 |
| 2001/0043011 | A1 | * | 11/2001 | Ugusa et al. | 307/10.1 |
| 2004/0065497 | A1 | * | 4/2004 | Roelleke et al. | 180/282 |

FOREIGN PATENT DOCUMENTS

| DE | 41 16 336 C1 | 6/1992 | |
|---|---|---|---|
| DE | 43 02 399 A1 | 3/1994 | |
| DE | 196 48 917 A1 | 5/1998 | |
| DE | 199 20 945 A1 | 12/1999 | |
| DE | 199 17 710 A1 | 10/2000 | |
| DE | 100 20 084 A1 | 11/2001 | |
| DE | 101 02 996 C1 | 8/2002 | |
| EP | 0 852 193 B1 | 7/1998 | |
| JP | 05038997 A | * 2/1993 | ........... B60R/21/32 |

* cited by examiner

*Primary Examiner*—Thomas G. Black
*Assistant Examiner*—Tuan C To
(74) *Attorney, Agent, or Firm*—Crowell & Moring LLP

(57) ABSTRACT

The invention relates to a method for determining the key crash phases for triggering a passive safety device in a vehicle. According to the invention method, an acceleration signal (ax) representing an acceleration (ax(t)) in the longitudinal direction of the vehicle is determined, and two window integrals are simultaneously set up at the beginning of the crash-related deceleration of the vehicle, by which means the deceleration signal (ax) is added or integrated over a pre-determined time window. The first time window is smaller/equal to the minimum triggering time for triggering the safety device, and the second time window is significantly larger than the first window. The period during which the window integrals have the same value and during which said value is higher than a threshold value is defined as the first crash plane.

5 Claims, 1 Drawing Sheet

METHOD OF DETERMINING THE CRASH PHASES RELEVANT TO THE TRIGGERING OF A PASSIVE SAFETY DEVICE IN A VEHICLE

CROSS-REFERENCE TO RELATED APPLICATIONS

This application is a continuation of PCT Application No. PCT/EP02/10662 filed on Sep. 23, 2002, which claims priority to German Application No. 101 55 659.4 filed Nov. 13, 2001.

BACKGROUND AND SUMMARY OF THE INVENTION

The invention relates to a method of determining the crash phases relevant to the triggering of a passive safety device in a vehicle.

Safety systems in motor vehicles include passive safety devices, such as air bags, belt tighteners, rollover bars and the like. In the event of a dangerous accident (in the following, also called a "crash"), particularly of a dangerous impact, those passive safety devices are triggered in order to protect the vehicle occupants as much as possible from injuries. To accomplish this, it is necessary to trigger the individual safety devices in each case at an optimal point in time. The prerequisite for doing so is to perfect the recognition of an accident with respect to the type of crash and the seriousness of the crash.

An algorithm provided for this purpose, which analyzes the output signals of at least one crash sensor, should be able to recognize or differentiate between, for example, the following characteristics of a crash:

a) Start of the crash;
b) Type of crash: Offset 100% to 25%;
c) Crash impact angle 30° to 90°; and
d) Crash impact speed.

However, the crash algorithm not only has to be able to differentiate between greater number of crash events, it also has to be extremely stable. This means, on the one hand, that it has to be possible, by using the algorithm, to also recognize accidents (for example, the impact of a vehicle against a soft obstacle at a low speed), in which the safety devices should not be triggered (so-called no-fire crashes), or when only some of the existing safety devices should be triggered. On the other hand, it has to be possible to also unambiguously recognize operating conditions of the vehicle which generate a crash sensor signal course that differs only insignificantly with respect to the signal course of the crash sensor in an actual crash, for example, in the case of an extreme stressing of the vehicle, as occurs, for example, during fast driving along a gravel and/or pothole plagued stretch of roadway.

Another difficulty consists of the fact that the above-mentioned information concerning a crash has to be available at a very early point in time relative to the start of the crash. As a rule, a crash against a rigid obstacle at a high speed requires an extremely early firing point in time, usually of less than 10 ms. However, the amount of information available up to this point in time is very small, and as a rule not "solid" or reliable information. This applies at least when, for example, one or more acceleration sensors are used as crash sensors and a threshold value is used as a triggering criterion for the safety devices. As experience shows, no-fire crashes may also exceed this threshold value.

It is an object of the invention to provide a method of determining the crash phases relevant to the triggering of a passive safety device in a vehicle, which method is reliable and permits an unambiguous recognition of the above-mentioned crash characteristics at an early stage.

This object is achieved by providing a method of determining the crash phase relevant to the triggering of a passive safety device in a vehicle, characterized in that an acceleration signal (ax) is determined which is representative of the acceleration (ax(t)) acting in the longitudinal direction of the vehicle. With the start of the crash-caused deceleration of the vehicle, simultaneously two window integrals are started by which the acceleration signal (ax) is added or integrated over the defined time windows. The first time window is smaller than/equal to the minimal triggering time for triggering the safety device and the second time window is significantly larger than the first time window. The time period during which the window integrals have the same value and during which this value is greater than a threshold value is defined as a first crash phase.

The reliability of the information concerning the crash is achieved by integral formation. The above-mentioned no-fire cases, as well as the above-mentioned excess vehicle stressing situations, when a corresponding threshold value is defined, can be differentiated from an actual crash with a necessary triggering of the safety devices. As a result of the selection of the integration time of the first window integral according to the invention, the crash type also becomes determinable by the earliest required triggering of the safety device. It can be derived from the value of the window integral. Finally, the start of the crash can also be determined.

The start of the crash can be recognized through the use of a separate sensor system. Thus, precrash sensors are known which react to objects approaching the vehicle. In this case, a conclusion can be drawn from the approach speed that a crash is imminent. With respect to the latter, the invention offers the possibility of calculating the start of the crash back from the window integrals themselves. The start is equivalent to the start of the first crash phase 1. If the first (and thus also the second) window integral has a value which is above the threshold value, a calculation can take place back to the point in time at which the integral formation began. This point in time corresponds to the start of the first crash phase 1.

The second crash phase 2 following first crash phase 1 can also be determined by use of the window integrals. The second crash phase 2 has certain characteristics. Its start depends on the start and on the duration of the first crash phase 1. Since these characteristics are certain, the start of the second crash phase 2 is also defined. This point in time is almost identical for all crash types because the former characteristics of the first crash phase 1 are also independent of the type of crash.

The second crash phase 2 exists when the second window integral has a higher value than the first window integral. This information is obtained on the basis of the different computation of the two integrals and, with respect to the processing, becomes noticeable in that the two window integrals have an integration start which increasingly differs with an increasing crash duration. That of the first window integral is increasingly displaced and is in each case set back by the window length with respect to the actual point in time, while the second window integral retains its integration start. The latter is characterized by the start of the first crash phase 1.

Other objects, advantages and novel features of the present invention will become apparent from the following detailed description of the invention when considered in conjunction with the accompanying drawings.

DETAILED DESCRIPTION OF THE DRAWINGS

Figure 1:
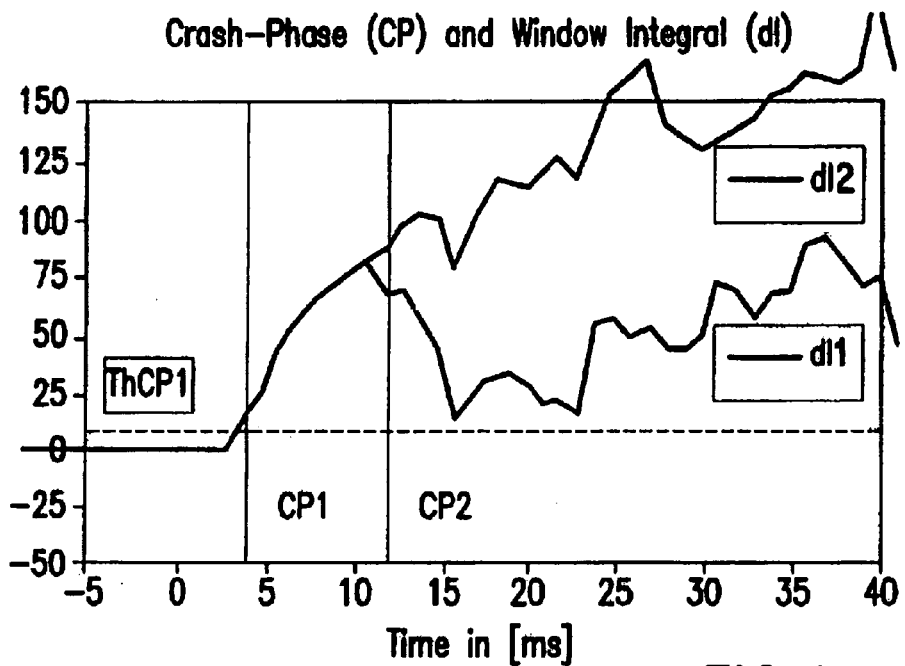
FIG. 1 is a chart of the course of the crash phases at a 50 km/h frontal crash against a rigid wall.
Figure 2:
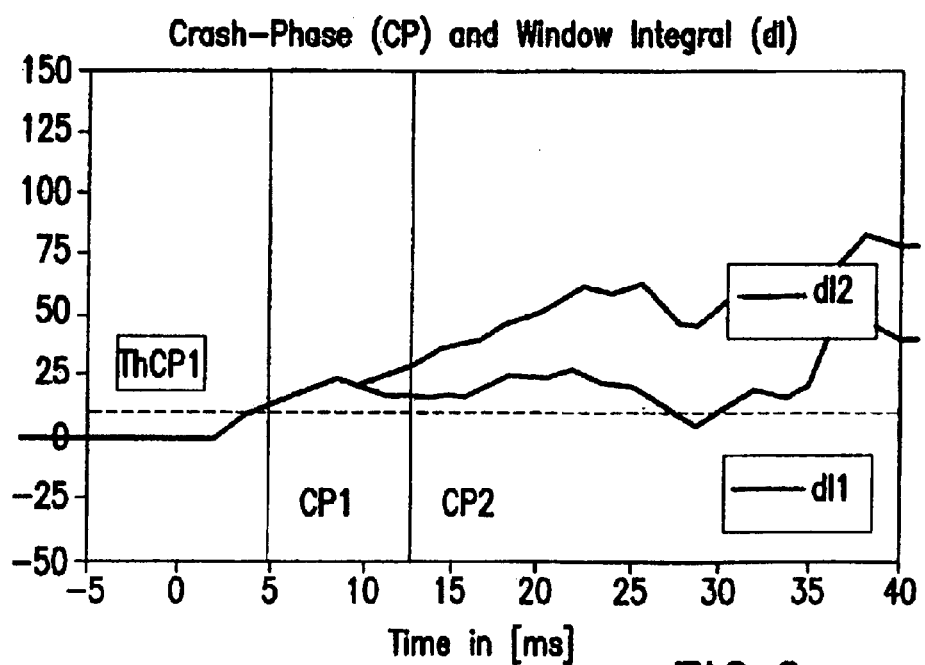
FIG. 2 is a chart of the course of the crash phases at a 50 km/h frontal crash against a deformable barrier at a 40% offset.

In accordance with the invention, and as illustrated in the charts of FIGS. 1 and 2, it is possible to determine the crash phases. This also includes the determination of the point in time at which the crash starts (=start of first crash phase 1=CP1), and, of the course of the crash after the conclusion of the first crash phase 1 (=second crash phase 2=CP2).

An acceleration signal (ax) representative of the acceleration (ax(t)) acting in the longitudinal direction of the vehicle is determined, for example, by an acceleration sensor (not shown) responding to accelerations in the longitudinal direction. Such an acceleration sensor is typically fastened to a vehicle cross member.

With the start of the crash-caused deceleration of the vehicle, simultaneously two window integrals dI1 and dI2 are started, by which the acceleration signal (ax) is summed-up or integrated by way of defined time windows. The value of each integral is an indication of the built-up speed. The integral dI1 has an integration time which is at least approximately the same, or slightly shorter, than the shortest triggering time of, for example, 8 ms, when all crash types and crash cases are considered. The integral dI2 has an integration time which is at least twice as long as that of integral dI1, typically equal to 24 ms.

When the two integrals have the same value, which is greater than a defined threshold value ThCP1, the following information is obtained: The crash start and thus the start of the first crash phase 1 is the point in time Z at which the window integrals are setup. In the figure, for reasons of clarity, this point in time is the same as the point in time at which the threshold value ThCP1 is reached. The end of the first crash phase 1 is defined by the integration time of the window integral and occurs at approximately 8 ms after the start of the crash (Z). At this point in time, it is ensured that there actually is a crash and the safety devices have to be activated.

Additional information concerning the above mentioned crash characteristics required for activation of the safety devices is also at least partially available at this point in time and is the result of the following characteristics of the two window integrals dI1 and dI2:

a) The at least approximately identical value of the integrals at this point in time is an indication of the impact speed and the impact angle.

b) The differential value of the two window integrals, which, as a rule, increases with time from this point in time, is characteristic of this type of crash.

As a result, the type of crash can also be determined, or the determination of the crash type implemented by means of the first window integral can be confirmed or corrected. It thereby becomes possible to retroactively analyze and correct as far as possible the assumptions made for the first crash phase 1, such as the type of crash and the probable crash course as well as the triggering points in time derived therefrom.

Thus, it becomes possible to optimally trigger the passive safety devices for the respective crash and, as a result, optimally protect the passengers.

The foregoing disclosure has been set forth merely to illustrate the invention and is not intended to be limiting. Since modifications of the disclosed embodiments incorporating the spirit and substance of the invention may occur to persons skilled in the art, the invention should be construed to include everything within the scope of the appended claims and equivalents thereof.

What is claimed is:

1. A method of determining crash phases relevant to a triggering of a passive safety device in a vehicle, the method comprising the acts of:

obtaining an acceleration signal representative of an acceleration acting in a longitudinal direction of the vehicle;

starting two window integrals simultaneously with a start of a crash-caused deceleration of the vehicle, by which two window integrals the acceleration signal is added or integrated over pre-determined time windows;

setting a first time window to be equal to or less than a minimal triggering time for triggering the safety device and a second time window to be significantly longer than the first time window; and defining a time period during which the window integrals have the same value, and during which said same value is greater than a threshold value, as a first crash phase relevant to the triggering of the passive safety device in the vehicle.

2. The method according to claim 1, wherein the starting of the two window integrals with the start of the crash-caused deceleration of the vehicle is defined in a retroactive manner.

3. The method according to claim 1, wherein a start of an integral calculation is repeated at time intervals that are significantly shorter than an integration time of the window integrals.

4. The method according to claim 2, wherein a start of an integral calculation is repeated at time intervals that are significantly shorter than an integration time of the window integrals.

5. A software product, comprising:

a computer-readable medium having stored thereon programs code segments that:

obtain an acceleration signal representative of an acceleration acting in a longitudinal direction of the vehicle;

start two window integrals simultaneously with a start of a crash-caused deceleration of the vehicle, by which two window integrals the acceleration signal is added or integrated over pre-determined time windows;

set a first time window to be equal to or less than a minimal triggering time for triggering the safety device and a second time window to be significantly longer than the first time window; and define a time period during which the window integrals have the same value and during which said same value is greater than a threshold value as a first crash phase relevant to the triggering of the passive safety device in the vehicle.

* * * * *